United States Patent [19]
Williams

[11] Patent Number: 5,136,298
[45] Date of Patent: Aug. 4, 1992

[54] MICROWAVE RANGE DETECTOR SYSTEM
[75] Inventor: Heyward S. Williams, Derry, N.H.
[73] Assignee: AM Sensor, Inc., Salem, N.H.
[21] Appl. No.: 666,888
[22] Filed: Mar. 8, 1991
[51] Int. Cl.⁵ ............................................. G01S 9/38
[52] U.S. Cl. .................................. 342/112; 342/129
[58] Field of Search ............................. 342/112, 129

[56] References Cited
U.S. PATENT DOCUMENTS

| | | | |
|---|---|---|---|
| 3,750,172 | 7/1973 | Tresselt | 342/112 |
| 4,740,045 | 4/1988 | Goodson et al. | 342/112 |
| 4,893,125 | 1/1990 | May | 342/129 |

Primary Examiner—Mark Hellner
Attorney, Agent, or Firm—Iandiorio & Dingman

[57] ABSTRACT

A microwave range detector system for determining the range of a moving object in a monitored area includes: a microwave antenna for focusing microwave energy in the area to be monitored; means for selectively generating microwave signals at a first microwave frequency and at a second microwave frequency for transmission by the antenna; microwave detector means, responsive to the microwave signal at the first microwave frequency and the return signal at the first microwave frequency from a target in the monitored area, for generating a pair of Doppler frequency signals with a fixed-phase relationshp, and responsive to the microwave signals at the first and second microwave frequencies and to the return signals at the first and second microwave frequencies, respectively, from a target in a monitored area, for generating a pair of Doppler frequency signals with a variable-phase relationship; direction decoder means, responsive to the Doppler frequency signals with the fixed-phase relationship, for determining which of the Doppler frequency signals with the fixed-phase relationship is leading and which is lagging to indicate the direction of motion of the object relative to the antenna; range decoder means responsive to the Doppler frequency signals with the variable-phase relationship, for determining the phase difference between the Doppler frequency signals with the variable-phase relationship; and means, responsive to the direction of motion indication from the direction decoder means and the phase difference from said range decoder means, for determining the range of the target from said antenna.

15 Claims, 12 Drawing Sheets

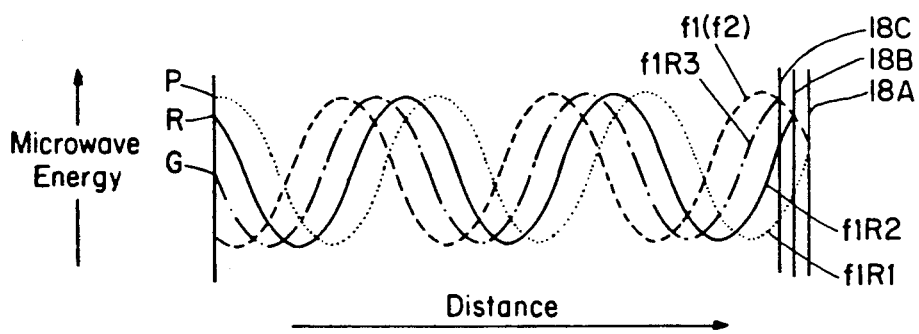
Fig. 3A
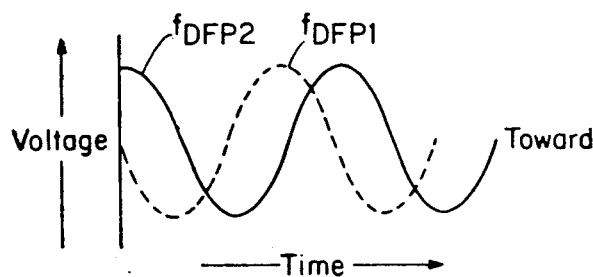
Fig. 3B
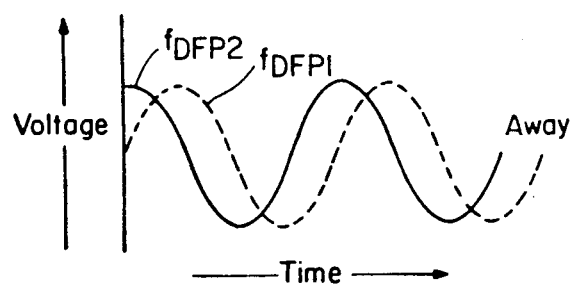
Fig. 3C
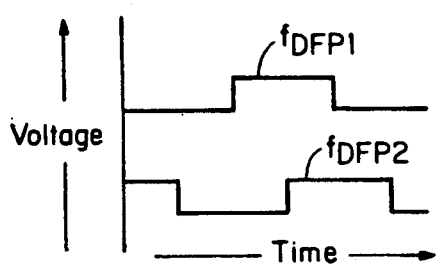
Fig. 3D
Fig. 3E

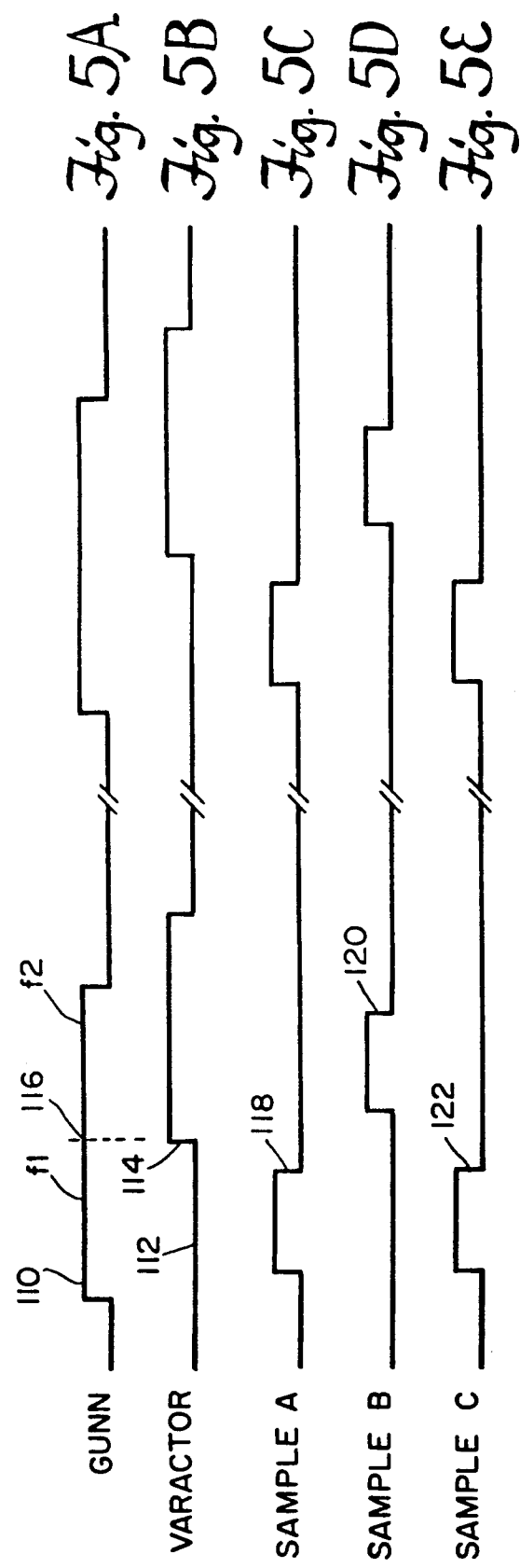

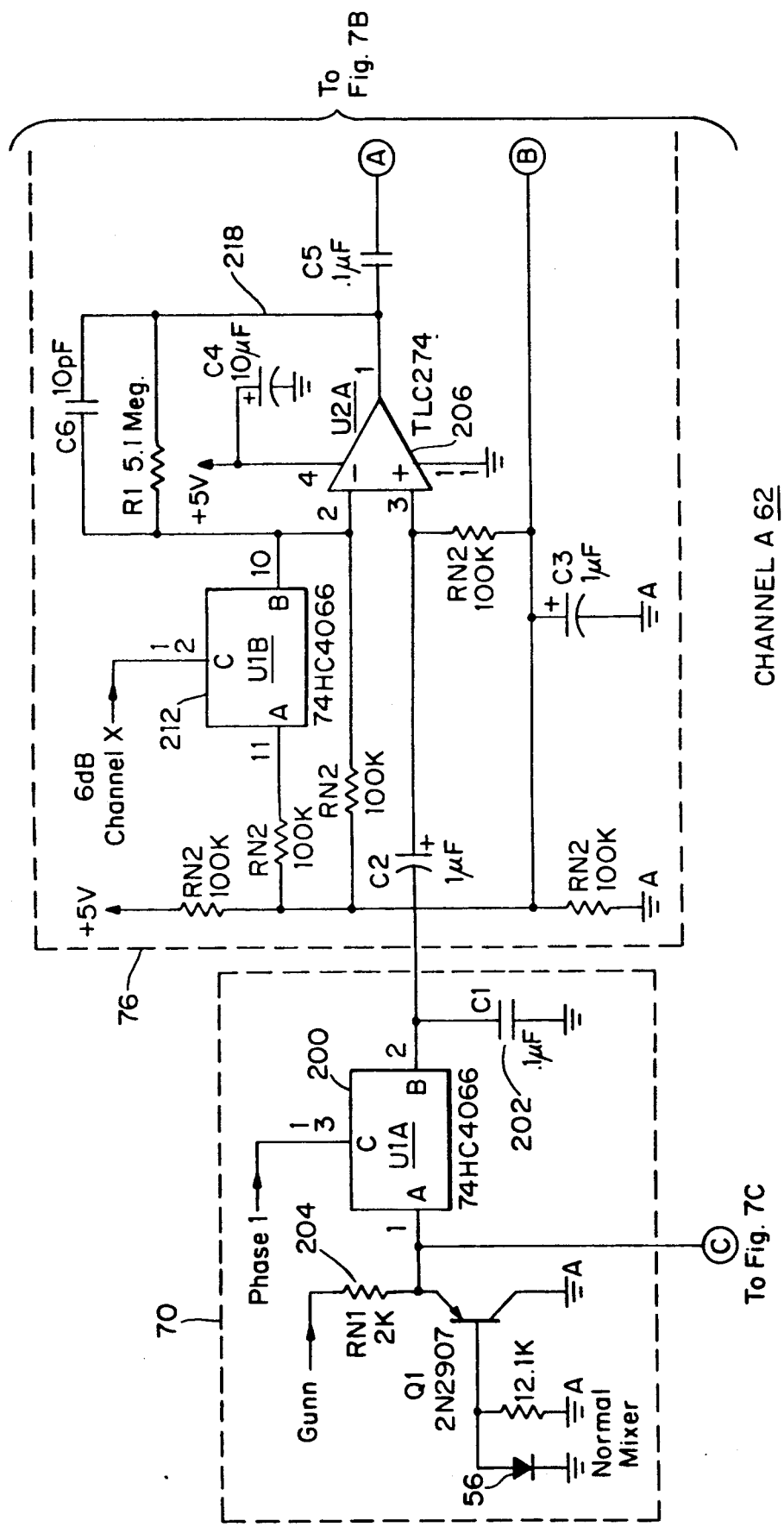
Fig. 7 SHEET 1 of 6

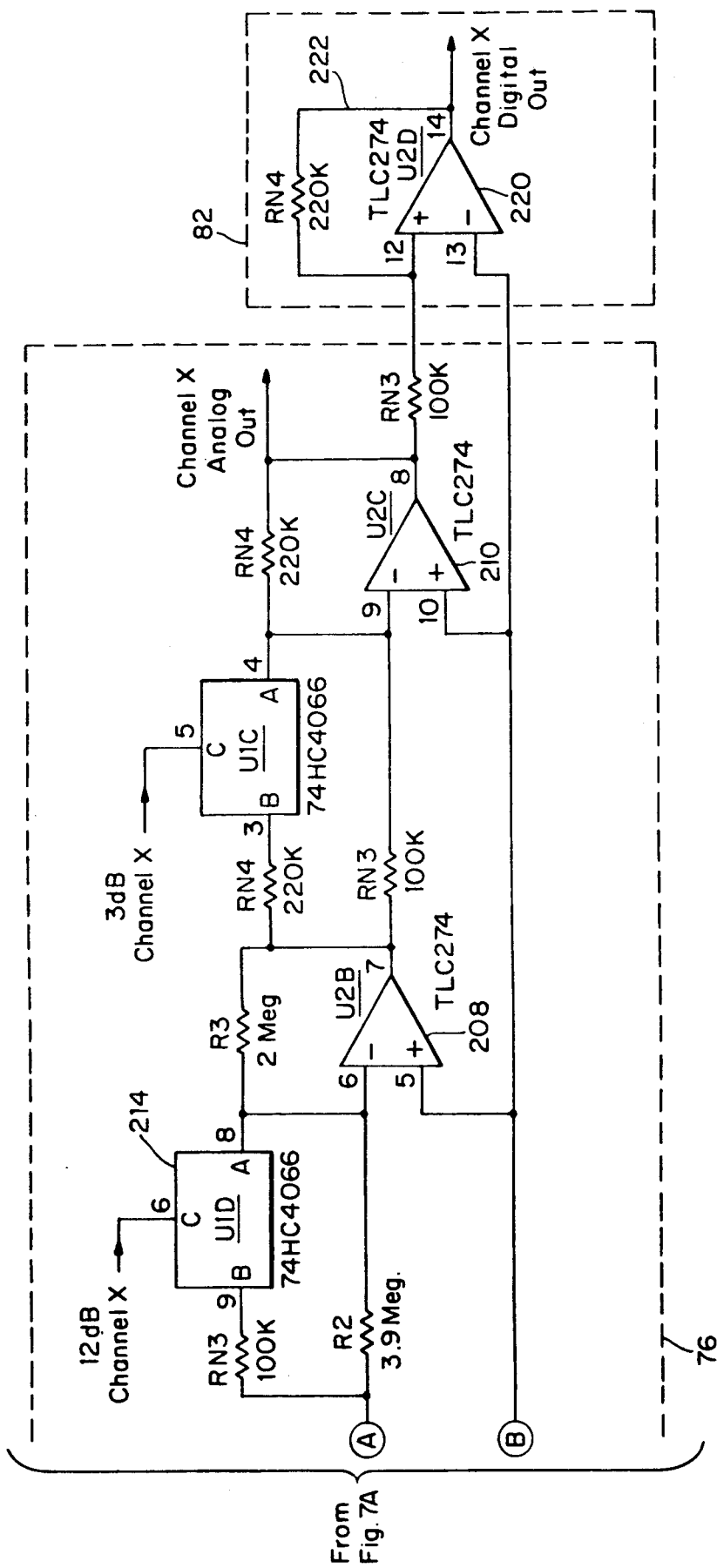
Fig. 7 SHEET 2 of 6
CHANNEL A 62

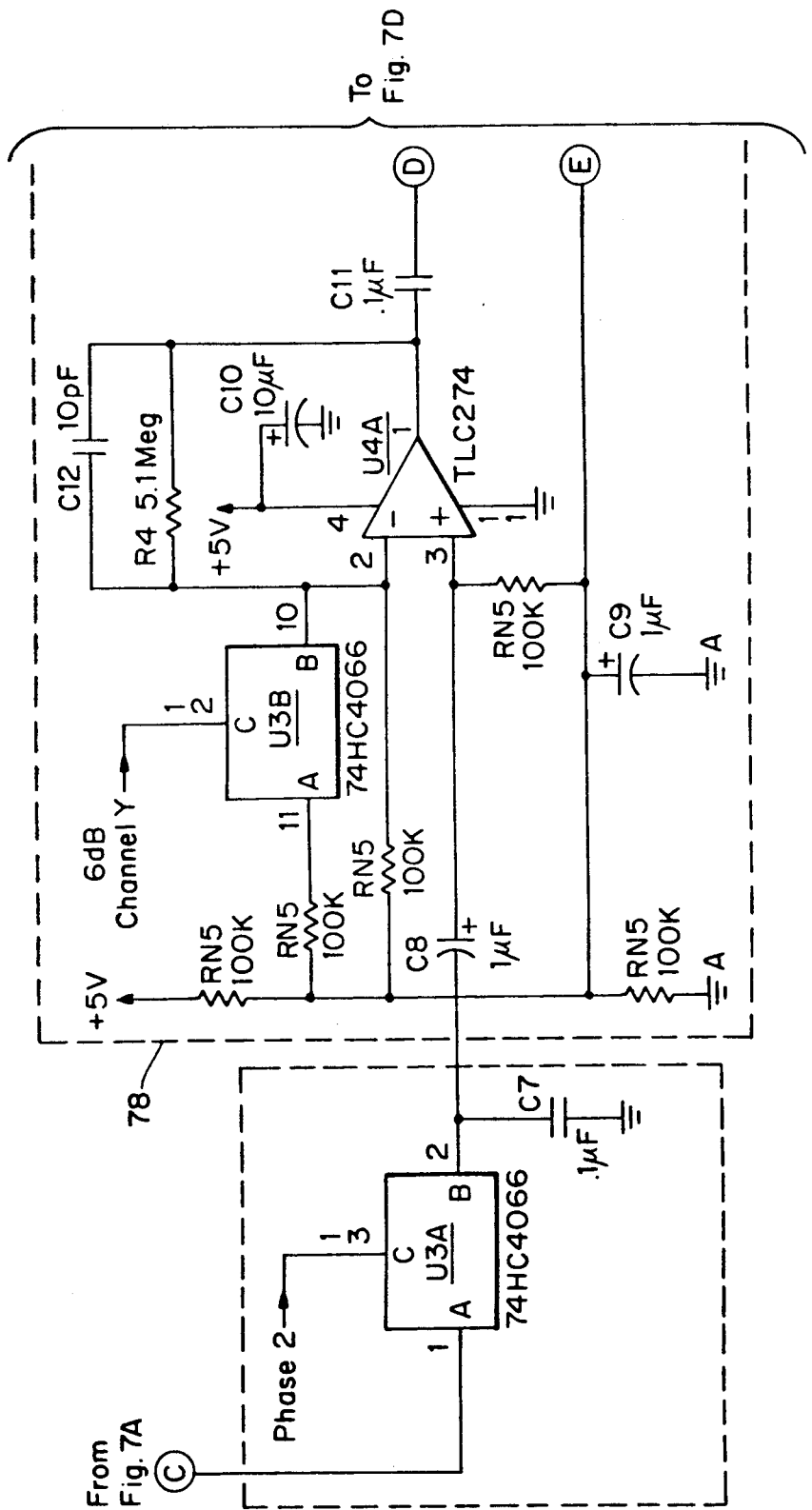

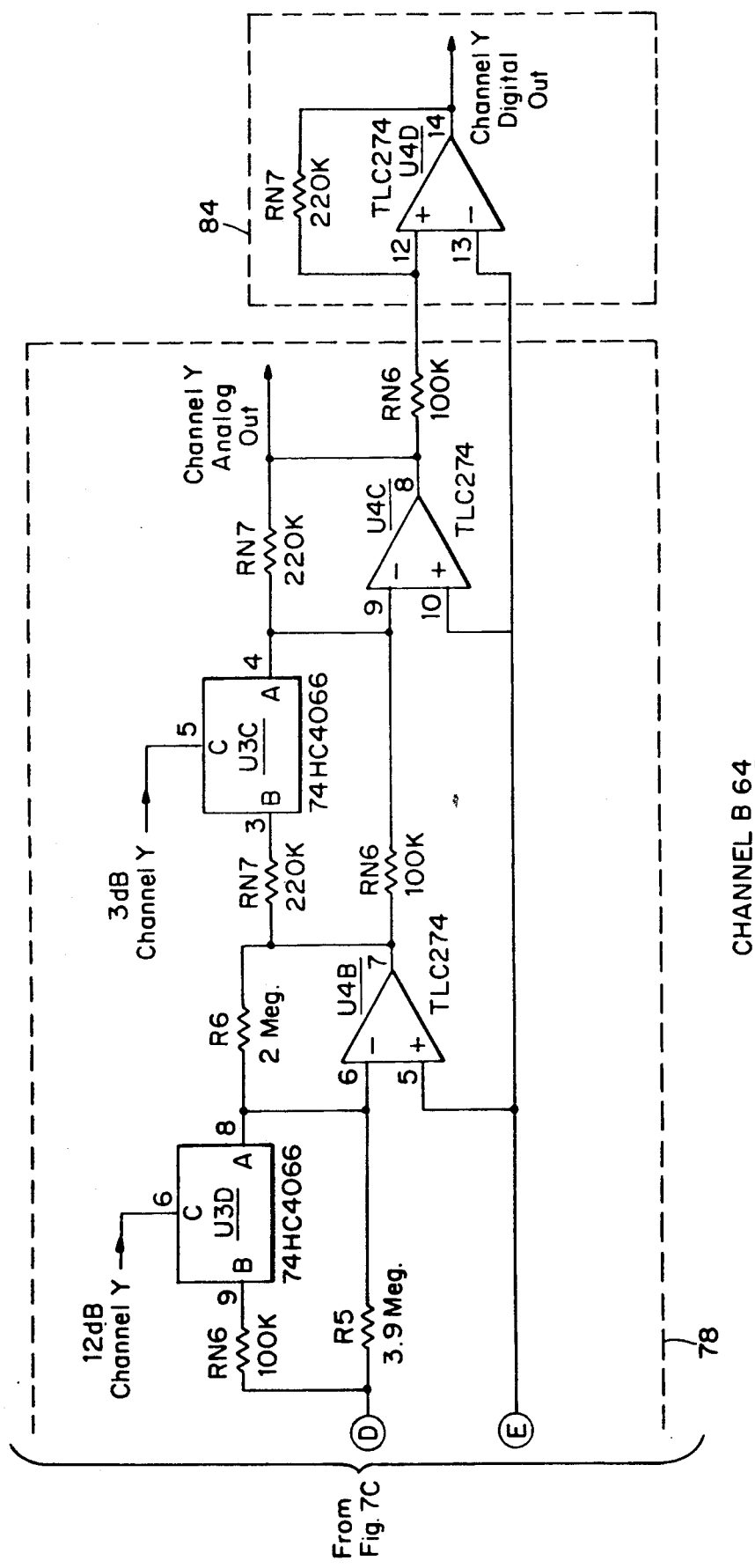
Fig. 7 SHEET 4 of 6

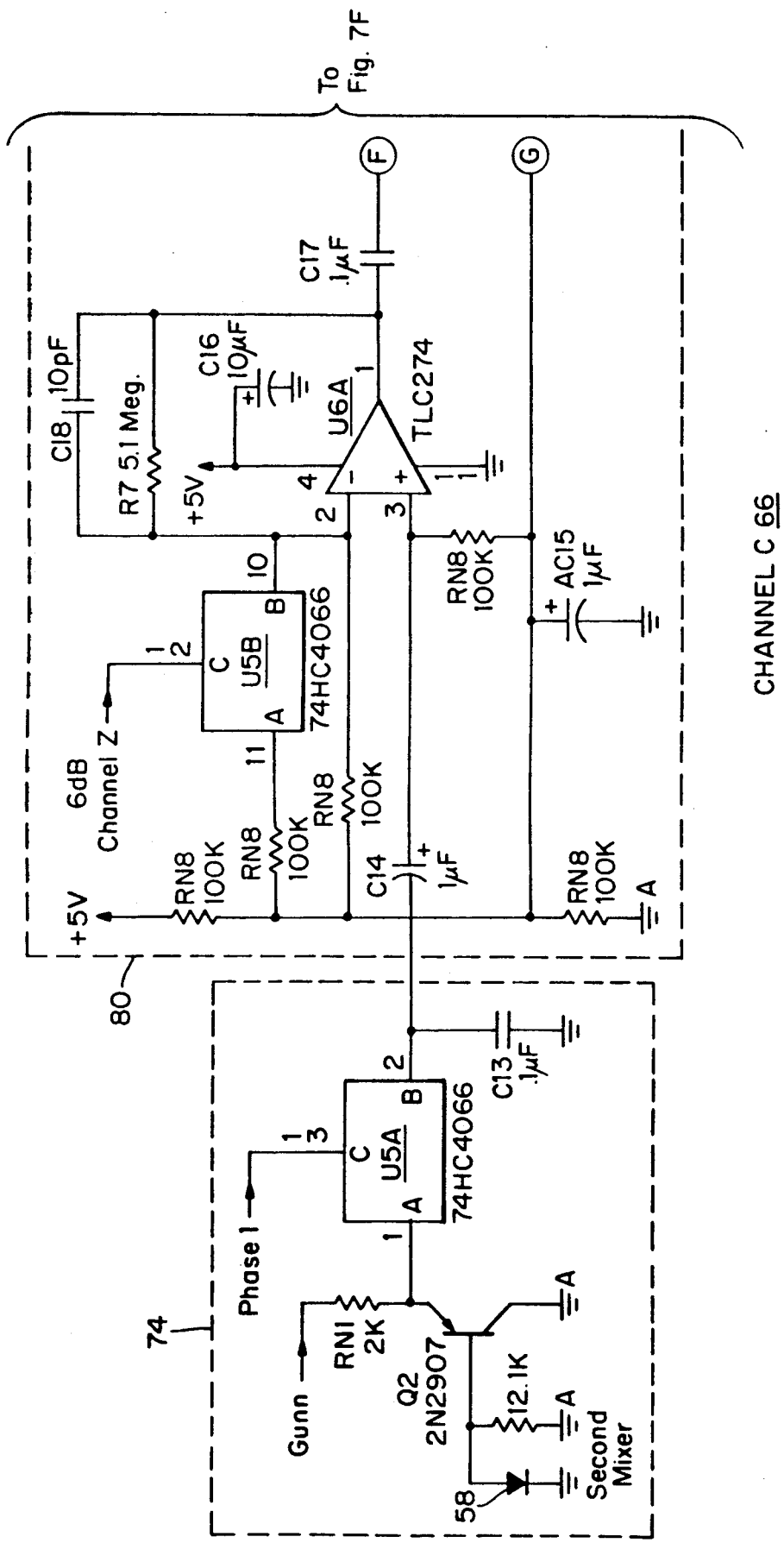
Fig. 7 SHEET 5 of 6

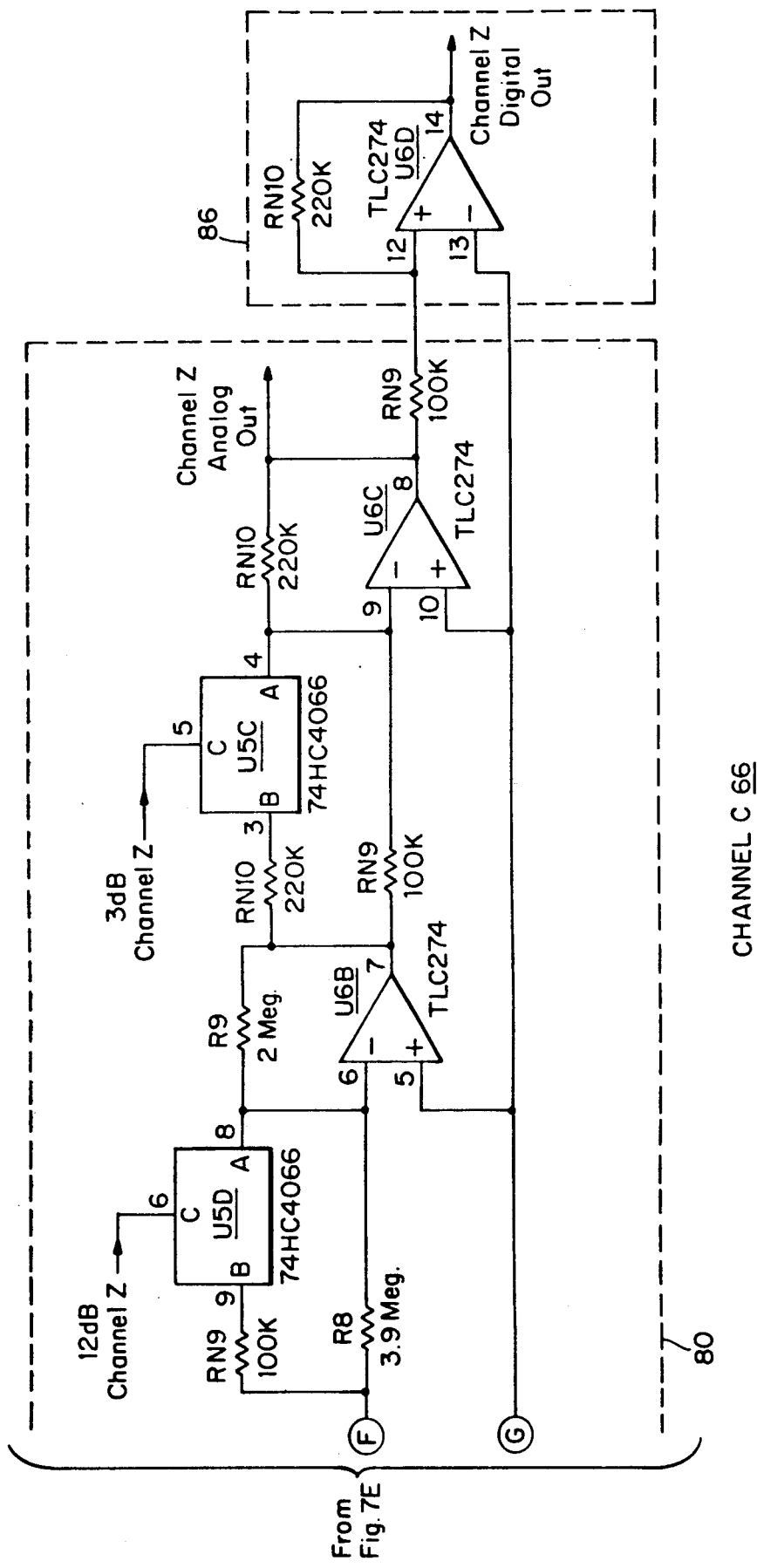
Fig. 7 SHEET 6 of 6

MICROWAVE RANGE DETECTOR SYSTEM

FIELD OF INVENTION

This invention relates to a microwave range detector system, and more particularly to such a microwave range detector system which uses one pair of Doppler frequency signals to determine an ambiguous phase indication of the distance to a target, and uses a second pair of Doppler frequency signals to resolve the phase ambiguity in accordance with the direction of motion of the target to provide an unambiguous range to the target.

BACKGROUND OF INVENTION

Conventional range detectors are available in frequency-modulated continuous-wave implementations but these are expensive and complex. A simpler approach of using the relative phase shift between two signals of different frequency or wavelength is known but is not practical because beyond a phase shift of 180° there is ambiguity. That is, a particular phase difference could indicate either a close target moving toward the antenna or a distant target moving away from the antenna, or the converse. Attempts to resolve this ambiguity by detecting the difference in the strength of the signal reflected from the target at a distance represented by a phase shift of under 180° from one over 180° is impractical because the signals are small and difficult to distinguish, making the device unreliable and unattractive for most applications. There are many applications where the target is moving and high reliability is required yet conventional sensors are precluded because of their cost and complexity. Other technologies such as ultrasonics are too sensitive to environmental conditions.

SUMMARY OF INVENTION

It is therefore an object of this invention to provide an improved microwave range detector system for determining the range of a moving target.

It is a further object of this invention to provide such a range detector system which is highly reliable, inexpensive, accurate, rugged and is less affected by the environment.

It is a further object of this invention to provide such a range detector system which has double the useful range without ambiguity.

It is a further object of this invention to provide such a range detector system which does not rely on signal thresholding for increased range.

It is a further object of this invention to provide such a range detector system whose range determination is independent of target velocity.

It is a further object of this invention to provide such a range detector system which is accurate even with high-speed targets.

It is a further object of this invention to provide such a range detector system whose range determination is unambiguous independent of the direction of motion of the target.

It is a further object of this invention to provide such a range detector system which is non-contact, low power, unaffected by environmental contaminants, non-invasive, small and lightweight.

It is a further object of this invention to provide such a range detector system which employs a single self-contained unit for transmitting and receiving.

The invention results from the realization that a truly effective range detector can be achieved by beating the return signals from two transmitted signals of different frequency to create two different Doppler frequency signals of variable-phase relationship, which phase relationship defines a primary and complementary phase difference depending upon the direction of motion of the target, and by beating the return signals from two transmitted signals of the same frequency to create two different Doppler frequency signals of fixed-phase relationship, which phase relationship defines the direction of motion of the target, and using that direction of motion to choose the one of the primary and complementary phase differences which represents the true range of the target.

This invention features a microwave range detector system for determining the range of a moving object in a monitored area. There is a microwave antenna for focusing microwave energy in the area to be monitored. There are means for selectively generating microwave signals at a first microwave frequency and at a second microwave frequency for transmission by the antenna. Microwave detector means, responsive to said microwave signals at the first microwave frequency and the return signal at the first microwave frequency from a target in the monitored area, generate a pair of Doppler frequency signals with a fixed-phase relationship. The microwave detector means is also responsive to the microwave signals at the first and second microwave frequencies and to the return signals at the first and second microwave frequencies, respectively, from a target in a monitored area, for generating a pair of Doppler frequency signals with a variable-phase relationship. Direction decoder means, responsive to the Doppler frequency signals with the fixed-phase relationship, determine which of the Doppler frequency signals with the fixed-phase relationship is leading and which is lagging to indicate the direction of motion of the object relative to the antenna. Range decoder means responsive to the Doppler frequency signals with the variable-phase relationship determine the phase difference between the Doppler frequency signals with the variable-phase relationship. There are means responsive to the direction of motion indication from the direction decoder means and the phase direction from said range decoder means, for determining the range of the target from the antenna.

In a preferred embodiment the means for selectively generating includes oscillator means for providing microwave energy. The oscillator means may include a Gunn diode cavity. The means for selectively generating may also include a varactor diode for varying the frequency of the generated microwave energy and timing means for alternately selecting the first and second microwave frequencies. The microwave detection means may include sampling means responsive to the timing means for sampling the Doppler frequency signals with the variable-phase relationship close to the transition between the first and second microwave frequencies. The microwave detector means may include a pair of microwave detectors spaced along the path of the return signals at the first frequency. The pair of microwave detectors may be spaced apart one quarter wavelength and they may be Shottky diodes. The microwave detector means may include means for comparing the transition of one Doppler frequency signal with the fixed-phase relationship with the level of the other Doppler frequency signal with the fixed-phase relationship to determine the direction of motion of the target relative to the antenna. The means for comparing may include a digitizer circuit for digitizing the Doppler frequency signals and the microwave detector means may include a preamplifier for amplifying and shaping the Doppler frequency signals.

There may be three Doppler signals, one of them being a reference signal which functions in a fixed-phase relationship with one of the remaining Doppler signals and in a variable-phase relationship with the other of the remaining Doppler signals. The range decoder may include means for defining the primary and complementary phase difference between the Doppler frequency signals with the variable-phase relationship. The means for determining may include means for identifying the one of the primary and complementary phase differences which represents the range to the target.

DISCLOSURE OF PREFERRED EMBODIMENT

Other objects, features and advantages will occur to those skilled in the art from the following description of a preferred embodiment and the accompanying drawings, in which:

FIG. 3A is an illustration of the microwave energy traveling to a moving target and back;

FIG. 3B is an illustration of the Doppler frequencies which are developed from the beating of the transmitted and returned microwave energy in FIG. 3A when the target is moving toward the antenna;

FIG. 3C is an illustration similar to FIG. 3B when the target is moving away from the antenna;

FIG. 3D is an illustration of the Doppler signals of FIG. 3B after they have been digitized;

FIG. 3E illustrates toward and away binary logic tables for the signals of FIG. 3D;

FIG. 5A illustrates the output of the Gunn diode of FIG. 2;

FIG. 5B illustrates the output from the varactor of FIG. 2;

FIG. 5C illustrates the sample pulse in channel A of FIG. 2;

FIG. 5D illustrates the sample pulse in channel B of FIG. 2;

FIG. 5E illustrates the sample pulse in channel C of FIG. 2;

FIG. 7 is a more detailed circuit diagram of the system of FIG. 2.

Figure 1:
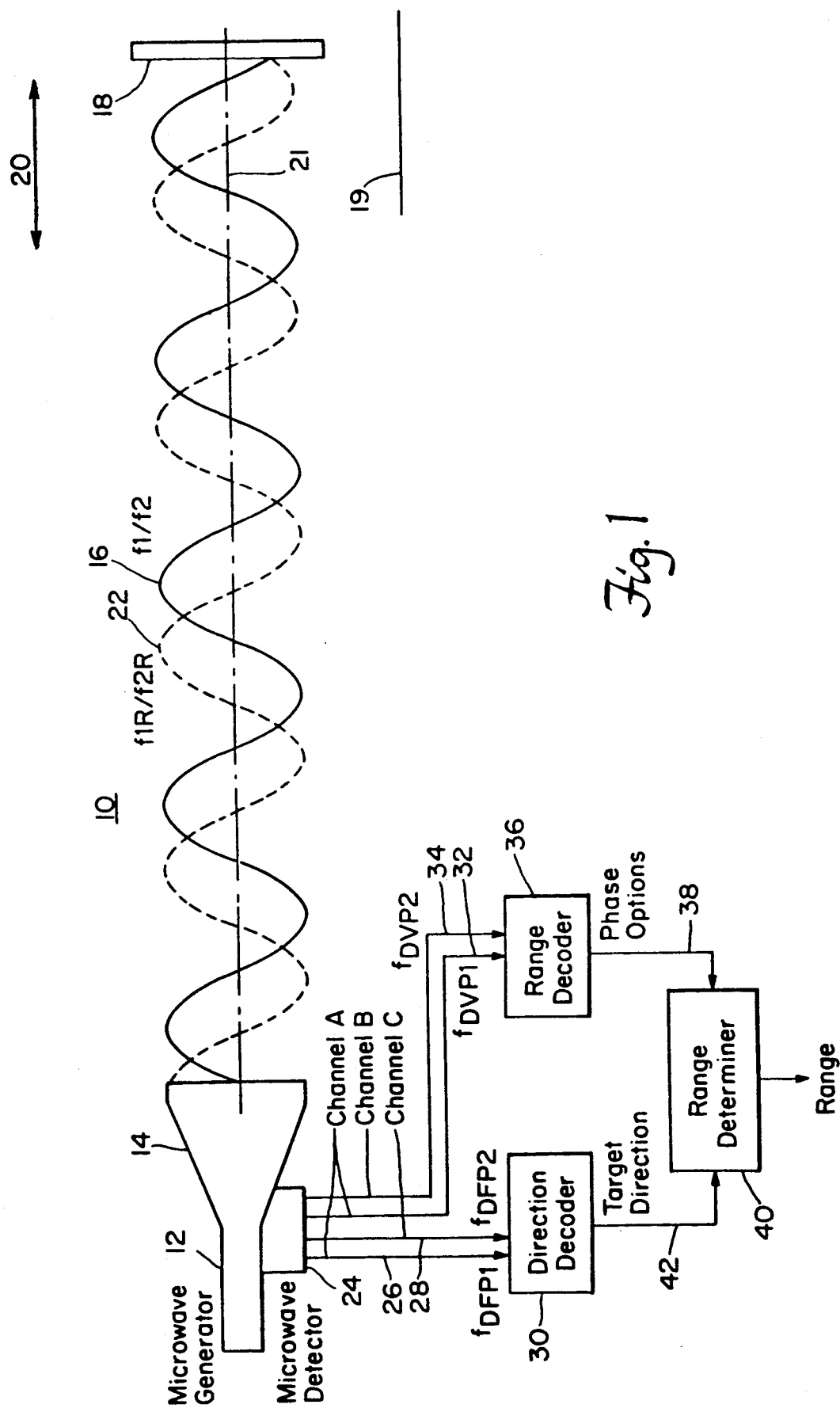
FIG. 1 is a simplified block diagram of a microwave range detector system according to this invention.

There is shown in FIG. 1 a microwave range detector system 10 according to this invention including a microwave generator 12 that provides one of two frequencies $f_1$ or $f_2$ to antenna 14, which transmits the microwave radiation 16 to a target 18 in an area to be monitored 19, in a direction either toward or away from antenna 14, as indicated by arrow 20. The reflected or return wave $f_{1R}$, $f_{2R}$ 22 is sensed by microwave detector 24. In microwave detector 24 the incoming reflected waves $f_{1R}$ and $f_{2R}$ are beat with the transmitted microwave frequencies $f_1$ and $f_2$ to develop four different Doppler signals. A first pair of Doppler signals $f_{DFP1}$, $F_{DFP2}$, which have a fixed-phase relationship between them, and a second pair of Doppler waves $f_{DVP1}$ and $f_{DVP2}$, which have a variable-phase relationship between them. The frequencies with the fixed-phase between them are delivered on lines 26 and 28 to direction decoder 30, which determines the direction of target 18 as being either toward or away from antenna 14. For further disclosure see the U.S. Patent application entitled "Microwave Direction of Motion Detection System", by the same inventor, Heyward S. Williams, filed on even date herewith and incorporated herein by reference.

The frequencies with the variable-phase relationship between them are delivered on lines 32 and 34 to range decoder 36 which ascertains the phase difference between the two frequencies and provides two phase options: a primary phase difference and a complementary phase difference, which is the difference between the primary phase and 360°. At this point the phase which represents the distance from the antenna to the target is ambiguous, as it is not known which way the target 18 is moving. The phase option information is delivered on line 38 to range determining circuit 40, which also receives the target direction information on line 42 from direction decoder 30. With this information range determining circuit 40 determines the actual range: that is, it selects either the primary or the complementary phase option and converts it to units of distance.

The frequencies $f_1$, $f_2$ can be in the X band, 10.525 GHz 5.0 MHz, or in the K band, 24.125 GHz ±5.0 MHz. With such a 10 MHz difference between $f_1$ and $f_2$ the unambiguous range is 50 feet. After a full wave phase difference ambiguity occurs. The difference between $f_1$ and $f_2$ can be as small or as large as desired so long as it covers the necessary range. The maximum unambiguous range can be determined by dividing the speed of light $3 \times 10^8$ meters per second by twice the frequency difference between $f_1$ and $f_2$.

Figure 2:
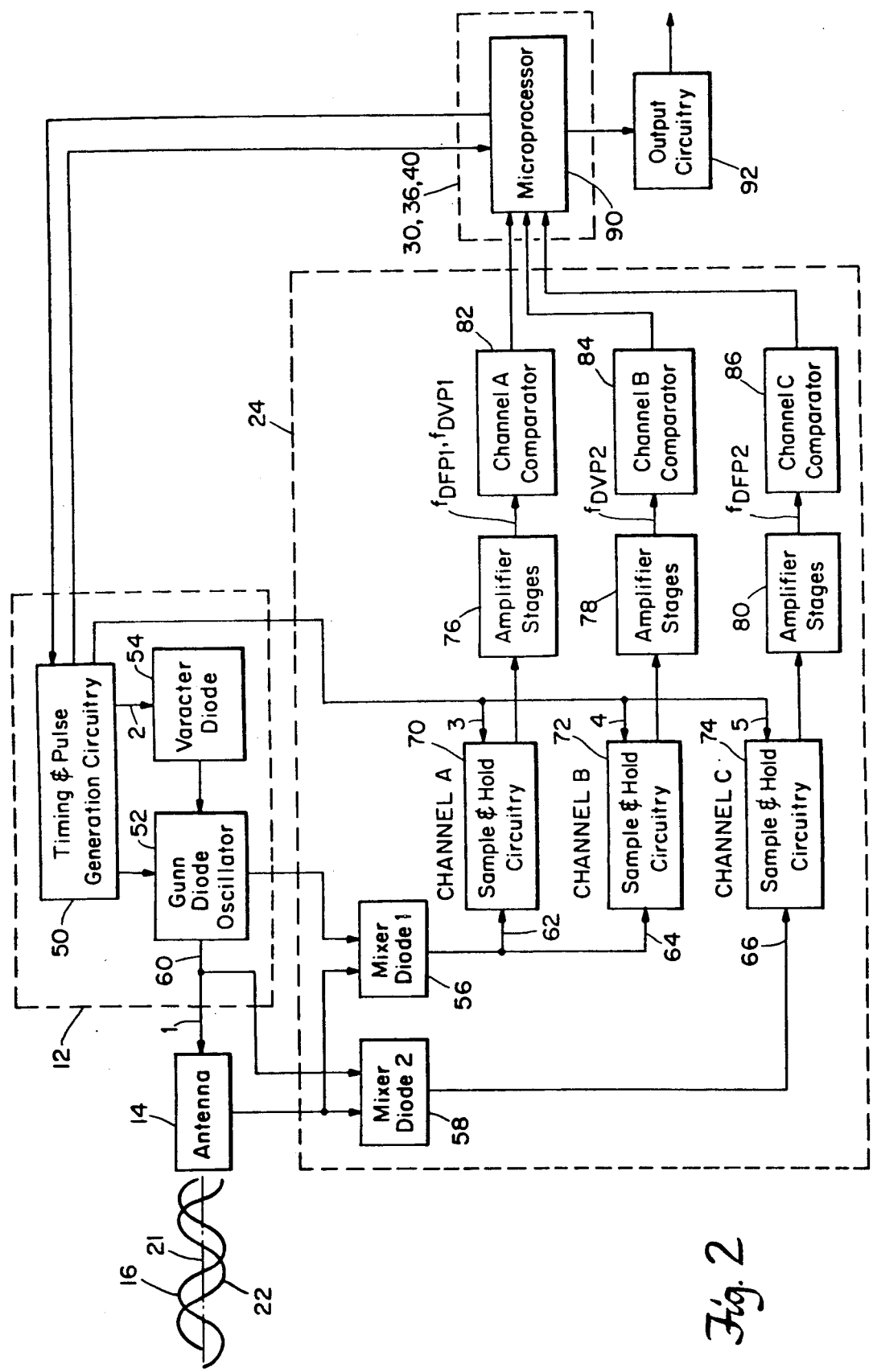
FIG. 2 is a more detailed block diagram of the system of FIG. 1.

Microwave generator 12, FIG. 2, includes a timing and pulse generation circuit 50 which generates timing pulses that control the timing and duty cycle of the microwave pulses provided by Gunn diode oscillator 52. Veractor diode 54 is also driven by timing and pulse generation circuits 50 to selectively switch Gunn diode oscillator between frequency $f_1$ and $f_2$. Microwave detector 24 includes detector diodes 56 and 58 which are typically mixer diodes such as Shottky barrier diodes. Diodes 56 and 58 mix the incoming reflective return microwave radiation 22 with the transmitted signal 16 on line 60 which is delivered from Gunn diode oscillator 52 to antenna 14.

The remainder of microwave detector 24 includes three similar channels, channel A 62, channel B 64 and channel C 66. Microwave detectors 56 and 58 are spaced from one another in the general direction of antenna axis 21. The fixed-phase difference introduced by the spacing of detectors 56 and 58, which for example could be quadrature spacing or any other suitable spacing, ultimately is developed into a pair of Doppler signals whose relative leading/lagging relationship determines whether target 18 is moving toward or away from antenna 14. Detector 56 also provides its output to channel B 64. While channels A and C are used to determine the direction of target 18, channels A and B are used to determine the distance of target 18 from antenna 14.

Outputs of detectors 56 and 58 are a series of pulses that are produced by the beating of the transmitted and reflected microwave pulses originated in Gunn diode oscillator 52. These beat signals from detectors 56 and 58 are sampled by sample and hold circuitry 70, 72 and 74 in channels A, B and C, respectively, to produce Doppler envelopes representing the phase difference between the transmitted microwave frequency signals. The Doppler signals are amplified in amplifiers 76, 78 and 80. In channel A the Doppler signals selectively include a fixed-phase Doppler frequency signal $f_{DFP1}$ and a variable-phase Doppler frequency signal $f_{DVP1}$. In channel B there is a single variable-phase Doppler frequency signal $f_{DVP2}$, and in channel C there is a single fixed-phase Doppler frequency signal $f_{DFP2}$. These signals are then digitized by comparators 82, 84 and 86 whose outputs are submitted to microprocessor 90 which performs the functions of direction decoder 30, range decoder 36 and range determiner 40. Microprocessor 90 may be a Motorola type 68HC11. Output circuitry 92 can provide visual or audio alarms or operate equipment in response to the direction and the range of the target.

The operation of the system to determine the direction of the target is explained more fully with respect to FIGS. 3A–D. The transmitted microwave energy signal $f_1$, FIG. 3A, moves out a distance to strike target 18 at a first position and is reflected back as wave $f_{1R1}$, and returns to the antenna at amplitude P. As the target moves from position 18a to position 18b, the return wave $f_{1R2}$ returns to the antenna at a slightly lower amplitude R due to the shift in phase. At a later point, as the target occupies position 18c closer to antenna 14, returning wave $f_{1R3}$ presents an even lower amplitude G to antenna 14. The signal developed by the variation in amplitude defines the Doppler envelope $f_{DFP1}$, FIG. 3B, produced by microwave detector 56. A similar Doppler frequency signal $f_{DFP2}$ is developed by microwave detector diode 58. Since the detectors 56 and 58 are permanently spaced apart a predetermined amount, the phase relationship between the Doppler signals $f_{DFP1}$ and $f_{DFP2}$ is fixed. As can be further understood from FIG. 3A, a similar set of Doppler curves is developed when target 18 is moving away from antenna 14 as shown in FIG. 3C. Thus it can be seen that when the target is moving toward the antenna as shown in FIG. 3B, the output of detector 56 leads that of detector 58, and when the target is moving away from the antenna 14 the converse is true: that is, the output of detector 58 leads that of detector 56. Therefore the direction of the target can be unambiguously determined. This is accomplished with the digitized the Doppler signals $f_{DFP1}$ and $f_{DFP2}$, FIG. 3D, produced by the comparators 82 and 86 at the outputs of channels A and C. For example, in FIG. 3E, chart 100, when the detector 56 output is zero and constant and the detector 58 output is decreasing, or when detector 56 output is rising and detector 58 output is constant at zero, or when detector 56 output is constant at 1 and detector 58 output is rising, or when detector 56 output is decreasing and detector 58 output is constant at 1, the indication is that the target is moving toward the antenna. A similar set of values inheres for the away logic as indicated in chart 102.

Figure 4A:
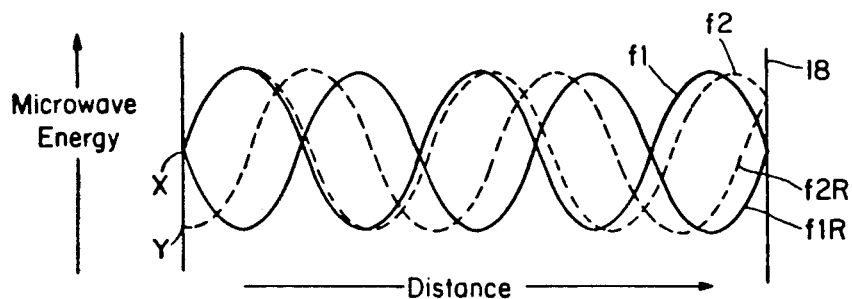
FIG. 4A is an illustration of microwave energy transmitted and received at two different frequencies at an instant when the target is stationary.
Figure 4B:
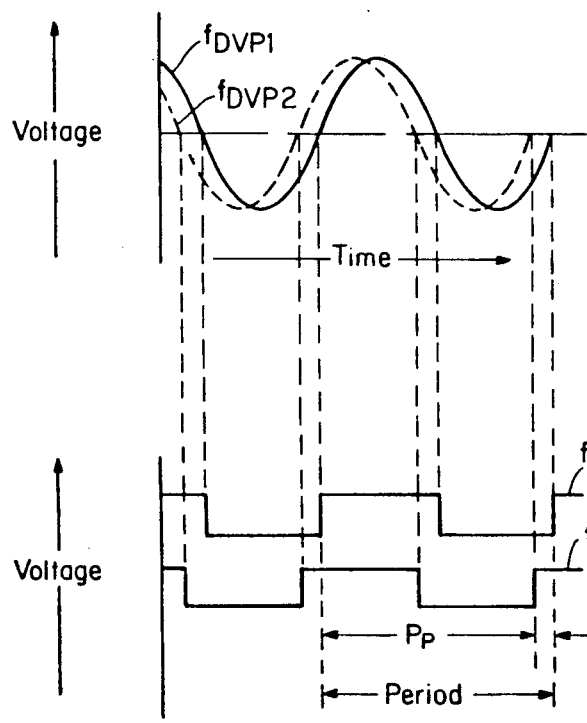
FIG. 4B illustrates the two Doppler signals developed from the transmitted and returned signals at the two different frequencies of FIG. 4A.
Figure 4C:
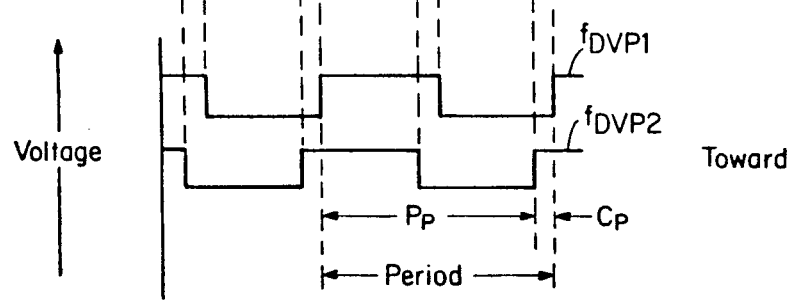
FIG. 4C illustrates the two Doppler signals of FIG. 4B after digitization showing the ambiguous primary and complementary phase differences when the target is moving toward the antenna.
Figure 4D:
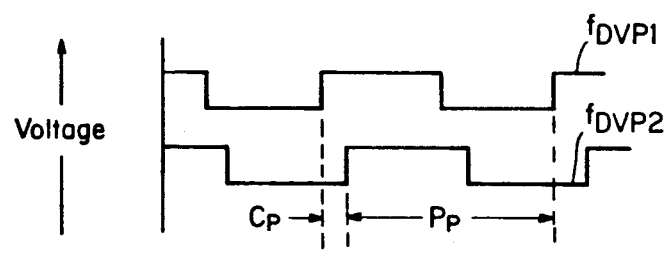
FIG. 4D is a view similar to FIG. 4C with the target moving away from the antenna.

The range determination is made as shown with respect to FIGS. 4A–D. Here two different frequencies $f_1$ and $f_2$, FIG. 4A, are transmitted by antenna 14 and strike target 18. Since $f_2$ has a slightly lower frequency, that is a longer wavelength, than $f_1$, the two signals will be increasingly out of phase as they approach target 18 and as they return to antenna 14, as represented by the amplitude difference between points X and Y, FIG. 4A. The variation in the phase, and thus the amplitude between X and Y, is a function of the distance of target 18 from antenna 14. The variation in the phase provides two Doppler frequency envelopes, FIG. 4B, $f_{DVP1}$ and $f_{DVP2}$, which occur at the outputs of the sample-and-hold circuits in channels A and B. These envelopes are digitized by the comparators 82 and 84 in channels A and B to provide the signals which appear as shown in FIG. 4C. Here it can be seen that when the target is moving toward the antenna the primary phase difference $P_p$ is large and the complementary phase difference $C_p$ is much smaller. The two together constitute the full period of one cycle of the Doppler frequency envelope. However, if the target is moving away from the antenna the Doppler frequency envelopes in channels A and B will appear as shown in FIG. 4D. In that case the primary phase $P_p$ is much smaller and the complementary phase difference $C_p$ is much larger as they form a part of the full period. By submitting both phase options to the microprocessor 90 and combining that with the directional information as developed in accordance with FIG. 3, the true range is obtained.

The timing of the transmitted and returned signals in conjunction with the sample-and-hold synchronizing signals are explained more fully in FIGS. 5A–E, where it can be seen that the Gunn diode signal 110 begins oscillating at the $f_1$ frequency, but midway 116 through its duty cycle switches to frequency $f_2$. This occurs as a result of the varactor signal 112, whose leading edge 114 causes the Gunn diode to switch at the midpoint 116 of its duty cycle. The same timing and pulse generation circuit 50 that provides timing signals 110 and 112 also provides the strobe signals 118, 120 and 122 to sample-and-hold circuits 70, 72 and 74 in channels A 62, B 64 and C 66, respectively. Strobe signal 118 causes sample-and-hold circuit 62 to sample during the Gunn diode duty cycle at the $f_1$ frequency while strobe 120 causes sample-and-hold circuit 72 to sample the Gunn diode signal 110 during the portion of its cycle where it is operating at frequency $f_2$. It is desirable that these two strobe signals 118 and 120 occur as close together as possible in order to minimize any effects due to the movement of the target between those two sampling times. Strobe signal 122 operates sample-and-hold circuit 74 to sample the output from microwave detector diode 58 at the same time as sample-and-hold circuit 70. There is no strobe to sample the output of microwave detector diode 58 during the portion of the cycle where the frequency is $f_2$. This is not necessary because the signal in channel A operates as a part of the channel A and B pair as well as a part of the channel A and C pair. If desired, two separate pairs of signals could be used.

Figure 6:
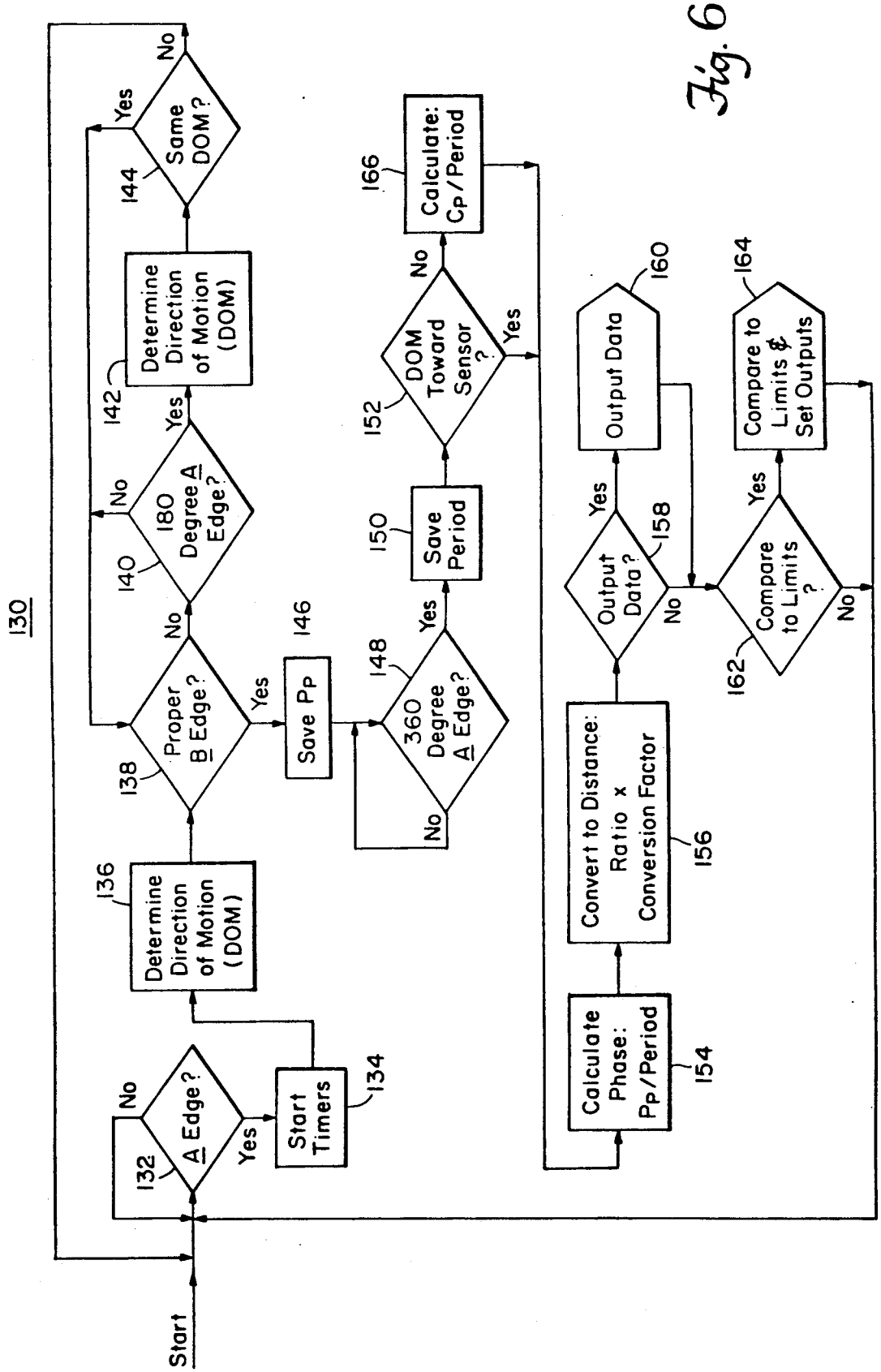
FIG. 6 is a flow chart which is used in the microprocessor shown in FIG. 2.

Microprocessor 90 operates in accordance with flow chart 130, FIG. 6. In flow chart 130 the microprocessor in step 132 looks for a transition in channel A, which could be either on signal $f_{DFP1}$ or $f_{DVP1}$, which are the same signal. If it finds no edge it simply goes back to start and makes the inquiry again. If it does find the edge it starts the timers in step 134. It measures the primary phase differential and the period of the Doppler frequency signal. From this it determines the direction of motion in step 136, for example, in accordance with the states in one of the charts 100 or 102 in FIG. 3E. It then seeks in step 138 to find out if there is a proper edge in channel B. If it does not find a proper edge it then makes an inquiry in step 140 as to whether there is an opposite transition edge in channel A. If there is, once again the direction of motion is determined in step 142 in the same way as in step 136. Then inquiry is made in step 144 as to whether the direction of motion is the same as determined by step 142 as it was when determined by step 136. If the answer is no, the system goes back to start and begins again. If the answer is yes, the system goes back to step 138 and again seeks to find whether the proper edge is present in channel B. By proper edge is meant either a positive-going transition or a negative-going transition depending upon which was chosen in step 132. The choice is arbitrary. Keying on either positive-going or negative-going transitions will provide the same results, so long as the transition chosen for B is the same as that chosen for A.

If in step 138 the proper edge, that is, the proper transition direction, is found in channel B, then in step 146 the time duration of the primary phase is saved, which is the time measured from the edge of A to the edge of B. Then in step 148 the full duration of the period of channel A is measured. This is done by seeking the next successive edge of the same transition direction in channel A, the distance between the two or the time between the two being the period of the digitized Doppler signal in channel A. This value is then saved in step 150 as constituting the full period. Inquiry is then made in step 152 as to whether the direction of motion is toward the sensor. If it is, the system simply calculates the ratio in step 154 of the primary phase to the full period and multiplies this in step 156 by a suitable conversion factor to get the distance in feet, meters, or other suitable units. In step 158 inquiry is made as to whether output data is required. If it is, output data is generated in step 160. If it is not, the distance calculated is compared to limits in step 162. If it compares favorably to the limits, then in step 164 the various indicators may be actuated depending upon what range the particular distance is in. For example, a 50 foot range may be divided into a 0-10 foot, a 10-20 foot, a 20-30 foot and a 30-50 foot range so that an operator or monitor using the device knows approximately where the target is. If in step 152 the determination is made that the target is not moving toward the sensor then it is assumed that it is moving away from the sensor, and in step 166 a calculation is made by dividing the complementary phase by the full period and then moving to step 156.

Each of channels A 62, B 64, C 66 are constructed the same, as shown in FIG. 7. Each sample-and-hold circuit, as exemplified by sample-and-hold circuit 70, FIG. 7, includes an analog switch 200 and capacitor 202 with an input buffer amplifier 204. Each amplifier, as exemplified by amplifier 76, includes three stages of amplification, op amps 206, 208 and 210, whose gains can be selected by analog gates 212, 214 and 216 which are controlled by microprocessor 90. A low-pass filter 218 is associated with amplifier 206. Each comparator as exemplified by comparator 82 includes a comparator 220 with a positive feedback loop 222.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A microwave range detector system for determining the range of a moving object in a monitored area, comprising:
    a microwave antenna for focusing microwave energy in the area to be monitored;
    means for selectively generating microwave signals at a first microwave frequency and at a second microwave frequency for transmission by said antenna;
    microwave detector means, responsive to said microwave signal at said first microwave frequency and the return signal at said first microwave frequency from a target in the monitored area, for generating a pair of Doppler frequency signals with a fixed-phase relationship, and responsive to said microwave signals at said first and second microwave frequencies and to the return signals at said first and second microwave frequencies, respectively, from a target in a monitored area, for generating a pair of Doppler frequency signals with a variable-phase relationship;
    direction decoder means, responsive to the Doppler frequency signals with the fixed-phase relationship, for determining which of the Doppler frequency signals with the fixed-phase relationship is leading and which is lagging to indicate the direction of motion of the object relative to the antenna;
    range decoder means responsive to the Doppler frequency signals with the variable-phase relationship, for determining the phase difference between the Doppler frequency signals with the variable-phase relationship; and
    means, responsive to the direction of motion indication from said direction decoder means and said phase difference from said range decoder means, for determining the range of the target from said antenna.

2. The microwave range detector system of claim 1 in which said means for selectively generating includes oscillator means for producing the microwave energy.

3. The microwave range detector system of claim 1 in which said oscillator means includes a Gunn diode cavity.

4. The microwave range detector system of claim 1 in which said oscillator means includes a varactor diode for varying the frequency of the generated microwave energy.

5. The microwave range detector system of claim 1 in which said oscillator means includes timing means for alternately selecting said first and second microwave frequencies.

6. The microwave range detector system of claim 5 in which said microwave detector means includes sampling means, responsive to said timing means, for sampling said Doppler frequency signals with the variable-phase relationship close to the transition between said first and second microwave frequencies 7. The microwave range detector system of claim 1 in which said microwave detector means includes a pair of microwave detectors spaced along the path of said return signals at said first frequency.

8. The microwave range detector system of claim 1 in which said pair of microwave detectors are spaced apart one quarter wavelength.

9. The microwave range detector system of claim 1 in which said pair of microwave detectors are Shottky diodes.

10. The microwave range detector system of claim 1 in which said microwave detector means includes means for comparing the transition of one Doppler frequency signal with the fixed-phase relationship with the level of the other Doppler frequency signal with the fixed-phase relationship for determining the direction of motion of the target relative to the antenna.

11. The microwave range detector system of claim 1 in which said means for comparing includes a digitizing circuit for digitizing said Doppler frequency signals.

12. The microwave range detector system of claim 1 in which said microwave detector means includes preamplifier means for amplifying and shaping said Doppler frequency signals.

13. The microwave range detector system of claim 1 in which there are three Doppler frequency signals: one of them is a reference signal which functions in a fixed-phase relationship with one of the remaining Doppler signals and in a variable-phase relationship with the other of the remaining Doppler signals.

14. The microwave range detector system of claim 1 in which said range decoder includes means for defining the primary and complementary phase difference between the Doppler frequency signals with the variable-phase relationship

15. The microwave range detector system of claim 14 in which said means for determining includes means for identifying the one of said primary and complementary phase differences which represents the range to the target.

* * * * *